UNITED STATES PATENT OFFICE.

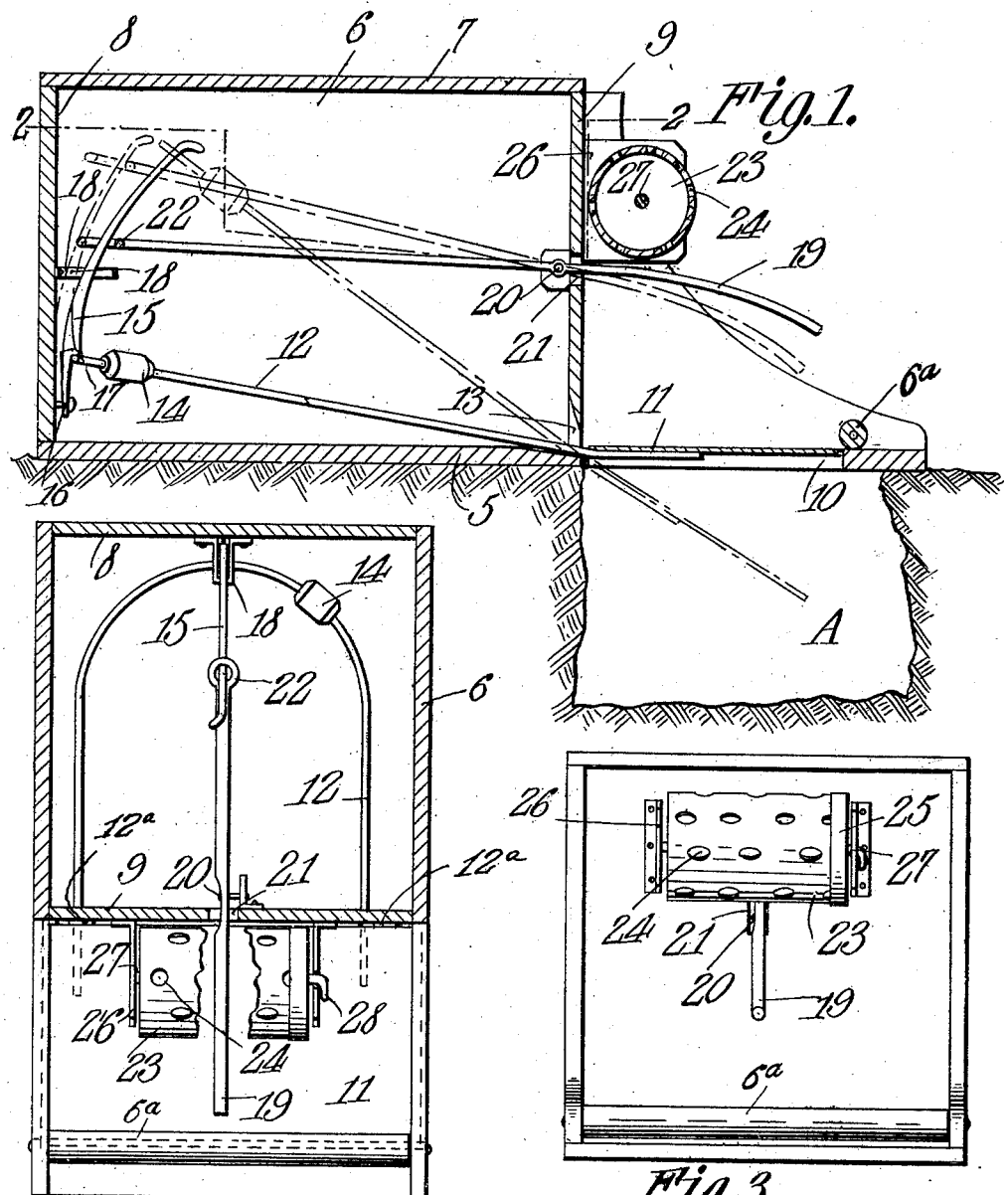

ALONZO C. WARNER, OF MUSKOGEE, OKLAHOMA, ASSIGNOR OF ONE-HALF TO LELA H. DE VASHER, OF MUSKOGEE, OKLAHOMA.

TRAP.

986,612.  Specification of Letters Patent.  Patented Mar. 14, 1911.

Application filed March 7, 1910. Serial No. 547,740.

*To all whom it may concern:*

Be it known that I, ALONZO C. WARNER, a citizen of the United States, residing at Muskogee, in the county of Muskogee and State of Oklahoma, have invented a new and useful Trap, of which the following is a specification.

It is the object of the present invention to provide an improved construction of trap and the invention relates more particularly to that class of traps which are associated with a pitfall and includes a trap plate upon which the animal steps and which normally covers the pitfall but is released to precipitate the animal into the pit upon springing of a trigger.

The invention aims primarily to provide such an arrangement of parts as will be productive of the best results and secondarily to provide an improved construction of the several parts whereby a sensitive and highly efficient trap will be afforded.

One novel feature of the invention resides in so locating the trigger of the trap that one end thereof will project above the trap plate upon which the animal must stand before being trapped and in arranging above this trigger a perforated rotatable bait box in which any suitable bait is to be placed.
With such an arrangement of the parts, it will be readily understood that the animal in attempting to reach the bait within the bait box will place one paw upon that end of the trigger which projects above the trap plate and in so doing will depress this end of the trigger thereby resulting in a release of the trap plate whereupon the animal will drop into the pitfall and the plate will automatically return to normal position or in other words, in position to be sprung by another animal.

In the accompanying drawings Figure 1 is a vertical longitudinal sectional view through the trap embodying the present invention, the trap being shown arranged at a pitfall. Fig. 2 is a horizontal sectional view through the trap on the line 2—2 of Fig. 1 and Fig. 3 is a front elevation of the trap.

In the drawings, the trap is illustrated as comprised in part of a base which is indicated by the numeral 5 and which constitutes the floor of a casing in which the mechanism of the trap is housed. Of the casing above mentioned, the side walls are indicated by the numeral 6, the top wall by the numeral 7, the rear end wall by the numeral 8 and the front end wall by the numeral 9, the casing being of less length from front to rear than the base plate 5 and sides 6 whereby the said base and sides will project in advance of the front of the casing. In the projecting portion of the base there is formed an opening 10 which is normally closed by a trap plate indicated by the numeral 11 and which is supported upon the extremities of a yoke indicated by the numeral 12. This yoke 12 has its arms pivotally mounted as at 12ª at the rear edge of the opening 10 and is adapted to swing upon its pivots whereby the trap plate may move from the position shown in full lines in Fig. 1 of the drawings to substantially the position shown in dotted lines in the said figure of the drawings.

It will be observed from an inspection of Fig. 1 of the drawings that the trap is disposed with the projecting portion of its base 5 extending over the pitfall with which the trap is associated, the pitfall being indicated by the reference character A. The arms of the yoke, as will be observed from the said Fig. 1 of the drawings, project through openings 13 formed in the forward wall 9 of the casing of the trap, the bowed portion of the yoke projecting into the casing. A weight 14 is fixed upon the bowed portion of the yoke 12 and tends normally to lower this portion, thereby raising the extremities of the arms of the yoke or in other words swinging them in an upward direction whereby to hold or tend to hold the trap plate 11 in the full line position as shown in Fig. 1 of the drawings. A detent 15 is pivoted at its lower end as at 16 upon the inner face of the rear wall 8 of the casing and projects upwardly and forwardly from the said wall and is provided with a shoulder 17 adjacent its lower end beneath which shoulder engages the bowed portion of the yoke 12, the yoke being, by reason of such engagement, held normally in full line position in Fig. 1. It will be understood, however, that should the detent 15 be swung in the direction of the rear wall 8 of the casing or in other words, to substantially the dotted line position in Fig. 1 of the drawings, the shoulder of the detent would disengage from the bowed portion of the yoke and the yoke would then be free to swing upon its pivots provided weight was imposed upon the trap plate 11. The detent 15 works in a suitable guide 18 which limits its swinging movement, the guide being positioned upon the said inner face of the rear wall of the casing.

The trigger of the trap is in the nature of a rod 19 which is pivoted at a point between its ends as at 20 in an opening 21 in the forward wall 9 of the casing of the trap, the said trigger rod having a portion projecting forwardly beyond this wall and a portion projecting into the casing in the direction of the rear wall 8 thereof, the extremity of the latter portion being formed with an eye 22 through which the detent 15 projects. Normally the trigger rod 19 is in the position shown in full lines in Fig. 1 of the drawings and it will be readily understood that should its portion which projects forwardly beyond the forward wall of the casing be depressed to the dotted line position the detent 15 will be swung to dotted line position and as before stated such swinging movement will result in a release of the yoke supporting the trap plate 11 whereupon the weight imposed upon this plate will cause the same to swing downwardly, thereby precipitating an animal thereon into the pitfall A.

In order to induce an animal, stepping upon the trap plate 11, to swing down the forwardly projecting end of the trigger rod 19, there is arranged above the trigger rod a bait box or container, this container being located at such height as to render it necessary for an animal to place one or both fore paws upon the forwardly projecting end of the trigger rod in order to reach the container. The bait container above mentioned is in the form of a cylinder which is indicated by the numeral 23 and which is formed with a plurality of openings or perforations 24, one end of the cylinder having an integral closure and the other end being closed by a cover 25 fitted thereon. In mounting the container upon the trap casing, brackets 26 are secured upon the forward wall 9 of the casing and project forwardly therefrom and have journaled therein the extremities of a spindle or rod 27 upon which the container 23 is mounted, this rod extending axially of the container. In mounting the extremities of the rod 27 in the brackets, one end of the rod is inserted in an opening formed in one of the brackets and the other bracket is formed with a notch indicated by the numeral 28 in which the other end of the rod is engaged, it being understood that this latter end of the rod may be readily disengaged from the notch whereupon the cover 25 of the container may be removed and bait be placed within the container.

From the foregoing description of the invention it will be readily understood that an animal stepping upon the trap plate 11 will, in an attempt to reach the bait within the container 23, place one or both fore paws upon the forwardly projecting end of the trigger rod 19 and that in so doing will depress this end of the rod thereby releasing the trap plate and permitting it to swing to the dotted line position shown in Fig. 1 of the drawings.

To render it difficult for an animal to secure a hold on the edge of the opening 10 when the door 11 is dropped, a roller 6ª is arranged at the forward edge of the said opening.

What is claimed is:

1. In a device of the class described, a casing, a trap plate, a tilting member supporting the plate and extending through the forward wall of the casing, the trap plate being located in advance of the said forward wall of the casing, a detent engaging with the member and holding the same normally against tilting, a pivoted trigger arm having the portion rearwardly of its pivot extending within the casing and having sliding engagement with the detent and arranged to move it out of engagement with the tilting member when rocked upon the pivot in one direction, the portion of the trigger arm forwardly of its pivot extending through and beyond the front wall of the casing above the trap plate, and a bait holder supported in advance of the forward wall of the casing and immediately above the said forwardly projecting end of the trigger arm.

2. In a device of the class described, a casing, a tilting member projecting through the forward wall of the casing, a trap plate supported by the member in advance of the front wall of the casing, a pivoted detent having a shoulder engaged by the rear portion of the tilting member, a trigger arm pivoted through the front wall of the casing and provided at its rear end with an eye through which projects the said detent, the portion of the trigger arm forwardly of its pivot projecting through and beyond the front wall of the casing, and a bait holder mounted above the said forwardly projecting portion of the trigger arm.

In testimony that I claim the foregoing as my own, I have hereto affixed my signature in the presence of two witnesses.

ALONZO C. WARNER.

Witnesses:
J. HOUSTON CHILDERS,
ETNA A. MURPHY.

---

Copies of this patent may be obtained for five cents each, by addressing the "Commissioner of Patents, Washington, D. C."